United States Patent
Tanaka et al.

(10) Patent No.: US 12,442,747 B2
(45) Date of Patent: Oct. 14, 2025

(54) CRIMPING DETERMINATION DEVICE, CRIMPING DETERMINATION METHOD, CRIMPING DETERMINATION PROGRAM, WIRE HARNESS PROCESSING DEVICE, AND WIRE HARNESS PROCESSING METHOD

(71) Applicant: Kabushiki Kaisha Toshiba, Tokyo (JP)

(72) Inventors: Akira Tanaka, Yokohama Kanagawa (JP); Masashi Watanabe, Yokohama Kanagawa (JP); Emi Sato, Machida Tokyo (JP); Juhong Yang, Akishima Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 374 days.

(21) Appl. No.: 18/168,761

(22) Filed: Feb. 14, 2023

(65) Prior Publication Data
US 2023/0304912 A1    Sep. 28, 2023

(30) Foreign Application Priority Data
Mar. 23, 2022  (JP) ................. 2022-046308

(51) Int. Cl.
G01N 15/08  (2006.01)
G06T 7/00  (2017.01)

(52) U.S. Cl.
CPC ........... *G01N 15/088* (2013.01); *G06T 7/001* (2013.01); *G06T 2207/30108* (2013.01)

(58) Field of Classification Search
CPC .... G01N 21/95; G01N 21/91; G01N 21/8851; G01N 21/952; G06T 7/001
(Continued)

(56) References Cited

U.S. PATENT DOCUMENTS

| 2014/0144212 A1 | 5/2014 | Blanchard et al. |
| 2019/0170605 A1 | 6/2019 | Seemueller |
| 2021/0295487 A1 | 9/2021 | Tanaka et al. |

FOREIGN PATENT DOCUMENTS

| EP | 1315976 | 6/2003 |
| EP | 1315976 B1 | 12/2004 |

(Continued)

OTHER PUBLICATIONS

Communication under Rule 71(3) EPC issued by the European Patent Office and received in European Patent Application No. 23156535.9, dated Oct. 4, 2024, in 5 pages.

(Continued)

*Primary Examiner* — Sujoy K Kundu
(74) *Attorney, Agent, or Firm* — Knobbe, Martens, Olson & Bear, LLP

(57) ABSTRACT

A crimping determination device according to an embodiment includes a dropping unit, an image acquisition unit, and a control unit. The dropping unit drops a test solution to a wire harness. The wire harness includes a crimped portion in which an electric wire is crimped by a crimping terminal, a first electric wire portion in which the electric wire is exposed on a distal end side, and a second electric wire portion in which the electric wire is exposed on a proximal end side. The dropping unit drops the test solution to either one of the first electric wire portion and the second electric wire portion. The image acquisition unit acquires an image including the other one of the first electric wire portion and the second electric wire portion. The control unit determines a quality of a crimped state of the crimped portion based on the image.

13 Claims, 16 Drawing Sheets

(58) Field of Classification Search
USPC .......................................................... 702/35
See application file for complete search history.

(56) References Cited

FOREIGN PATENT DOCUMENTS

| | | | | |
|---|---|---|---|---|
| EP | 3125369 | | 2/2017 | |
| GB | 2340224 A | * | 2/2000 | ........... G01R 31/083 |
| JP | H07-161443 | | 6/1995 | |
| JP | H10-280708 | | 10/1998 | |
| JP | 2008-292345 A | | 12/2008 | |
| JP | 2012-028021 A | | 2/2012 | |
| JP | 2014-63611 | | 4/2014 | |
| JP | 2015-005424 | | 1/2015 | |
| JP | 2018179749 A | * | 11/2018 | ........... G01R 31/083 |
| JP | 2019-046736 A | | 3/2019 | |
| JP | 2020-052044 A | | 4/2020 | |
| JP | 2021-150230 A | | 9/2021 | |

OTHER PUBLICATIONS

Office Action issued in Japanese Patent Application No. 2022-046308, dated Aug. 4, 2025 in 14 pages.

* cited by examiner

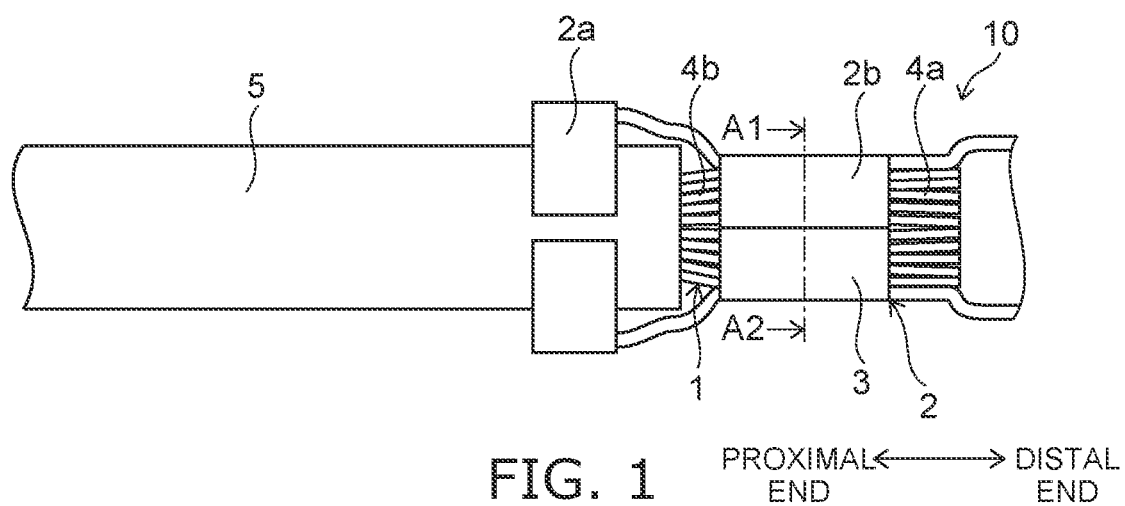
FIG. 1   PROXIMAL END ←→ DISTAL END

| EXPERIMENTAL EXAMPLE | NUMBER OF PIXELS OF FIRST ELECTRIC WIRE PORTION | NUMBER OF PIXELS OF SECOND ELECTRIC WIRE PORTION | OUTFLOW RATE [%] | AVERAGE POROSITY [%] |
|---|---|---|---|---|
| EXPERIMENTAL EXAMPLE 1 | 5708 | 28 | 0.491 | 0.421 |
| EXPERIMENTAL EXAMPLE 2 | 10077 | 245 | 2.431 | 3.526 |
| EXPERIMENTAL EXAMPLE 3 | 14325 | 664 | 4.635 | 8.478 |
| EXPERIMENTAL EXAMPLE 4 | 11411 | 702 | 6.152 | 15.452 |

CRIMPING DETERMINATION DEVICE, CRIMPING DETERMINATION METHOD, CRIMPING DETERMINATION PROGRAM, WIRE HARNESS PROCESSING DEVICE, AND WIRE HARNESS PROCESSING METHOD

CROSS-REFERENCE TO RELATED APPLICATIONS

This application is based upon and claims the benefit of priority from Japanese Patent Application No. 2022-046308, filed on Mar. 23, 2022; the entire contents of which are incorporated herein by reference.

FIELD

Embodiments of the invention generally relate to a crimping determination device, a crimping determination method, a crimping determination program, a wire harness processing device, and a wire harness processing method.

BACKGROUND

In a wiring of an electronic device, a wire harness in which a crimping terminal is crimped to an electric wire is used for connection of a portion having a high wattage such as a power supply system. In such a wire harness, when the crimping terminal is not sufficiently crimped to the electric wire, oxidation of the electric wire or detachment of the electric wire may occur during an operation of the electronic device, a resistance value may be increased, and heat generation, smoking, or the like may occur.

Therefore, in the case of manufacturing a wire harness, product management is required so as not to ship a wire harness having a crimping failure. More specifically, for example, it is required to screen a wire harness having a crimping failure by determining a quality of a crimped state, or to process the wire harness having a crimping failure to improve the crimped state.

BRIEF DESCRIPTION OF THE DRAWINGS

FIG. 1 is a plan view schematically showing a wire harness according to an embodiment;

DETAILED DESCRIPTION

Figure 2A:
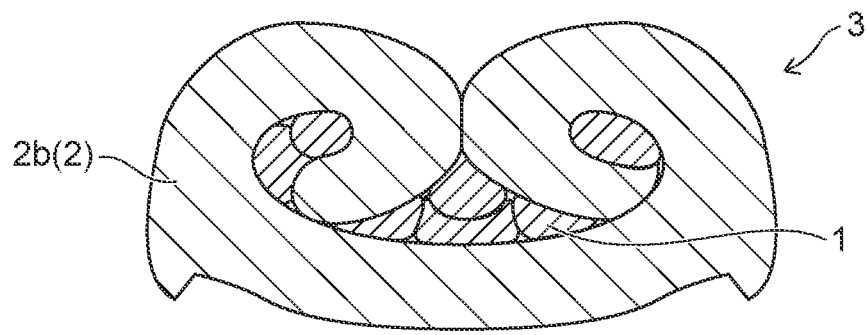
FIGS. 2A to 2C are cross-sectional views schematically showing an example of a crimped portion of a wire harness.

A crimping determination device according to an embodiment is a device configured to determine a quality of a crimped state of a wire harness in which a crimping terminal is crimped to an electric wire. The crimping determination device includes a dropping unit, an image acquisition unit, and a control unit. The dropping unit drops a test solution to the wire harness. The wire harness includes a crimped portion in which the electric wire is crimped by the crimping terminal, a first electric wire portion in which the electric wire is exposed on a distal end side with respect to the crimped portion, and a second electric wire portion in which the electric wire is exposed on a proximal end side with respect to the crimped portion. The dropping unit drops the test solution to either one of the first electric wire portion and the second electric wire portion. The image acquisition unit acquires an image including the other one of the first electric wire portion and the second electric wire portion. The control unit determines a quality of a crimped state of the crimped portion based on the image.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals; and a detailed description is omitted as appropriate.

FIG. 1 is a plan view schematically showing a wire harness according to an embodiment.

As shown in FIG. 1, a wire harness 10 includes an electric wire 1 and a crimping terminal 2 mounted at a tip of the electric wire 1.

The wire harness 10 includes multiple electric wires 1. A portion of each of the electric wires 1 is covered with an insulating covering member 5. The electric wire 1 contains a metal such as aluminum, copper, or a copper alloy. The crimping terminal 2 contains, for example, a metal such as aluminum, copper, or a copper alloy, or any of these metal whose surface is plated.

The crimping terminal 2 includes a first mounting portion 2a mounted on the covering member 5 and a second mounting portion 2b mounted on the electric wire 1. The first mounting portion 2a is mounted so as to cover a periphery of the covering member 5 that covers the electric wires 1. That is, the first mounting portion 2a is mounted on a portion of each of the electric wires 1 that is covered with the covering member 5. The first mounting portion 2a is fixed to the covering member 5 by crushing (caulking) the first mounting portion 2a in a manner of covering the periphery of the covering member 5.

The second mounting portion 2b is mounted so as to cover a periphery of the electric wires 1. That is, the second mounting portion 2b is mounted on a portion of the electric wires 1 not covered with the covering member 5. The second mounting portion 2b is fixed to the electric wires 1 by crushing (caulking) the second mounting portion 2b in a manner of covering the periphery of the electric wires 1. Accordingly, the second mounting portion 2b is electrically connected to the electric wires 1. That is, the second mounting portion 2b is crimped to the electric wires 1. In this way, the wire harness 10 includes a crimped portion 3 in which the crimping terminal 2 (the second mounting portion 2b) is crimped to the electric wires 1. In other words, the crimped portion 3 is a portion in which the electric wires 1 are crimped by the crimping terminal 2 (the second mounting portion 2b) and which is responsible for electrical connection.

The wire harness 10 further includes a first electric wire portion 4a and a second electric wire portion 4b. The first electric wire portion 4a is a portion in which the electric wires 1 are exposed on a distal end side with respect to the crimped portion 3 (that is, a side opposite to the covering member 5). The second electric wire portion 4b is a portion in which the electric wires 1 are exposed on a proximal end side with respect to the crimped portion 3 (that is, a covering member 5 side). The first electric wire portion 4a and the second electric wire portion 4b are portions that are not crimped by the crimped portion 3. That is, the first electric wire portion 4a and the second electric wire portion 4b are portions that are not covered by the crimped portion 3.

Figure 2B:
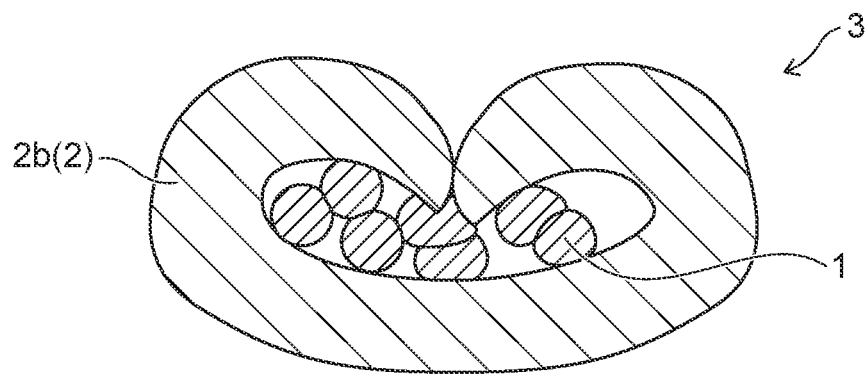
Figure 2C:
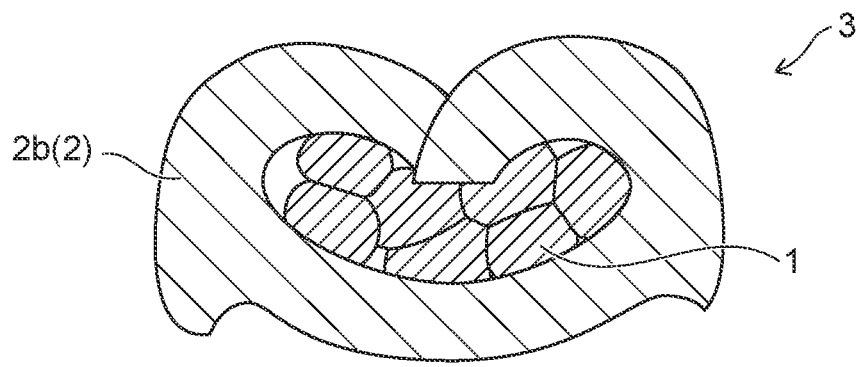

FIGS. 2A to 2C are cross-sectional views schematically showing an example of a crimped portion of a wire harness.

FIGS. 2A to 2C are cross-sectional views taken along a line A1-A2 shown in FIG. 1.

As shown in FIGS. 2A to 2C, in the crimped portion 3, the electric wires 1 are housed inside the crimping terminal 2 (the second mounting portion 2b). That is, in the crimped portion 3, the electric wires 1 are located in a space surrounded by the crimping terminal 2 (the second mounting portion 2b). Therefore, it is difficult to accurately determine a quality of a crimped state only from an external appearance of the crimped portion 3.

As shown in FIG. 2A, when the crimped state is good, no large gap is generated between the crimping terminal 2 and the electric wires 1. On the other hand, as shown in FIG. 2B, when the crimped state is poor, large gaps are generated between the crimping terminal 2 and the electric wires 1. Thus, by observing a cross section of the crimped portion 3, it is possible to estimate the quality of the crimped state to some extent.

However, for example, as shown in FIG. 2C, when a gap is generated between the crimping terminal 2 and the electric wires 1, but the gap is small, it is difficult to determine the quality of the crimped state. That is, it is difficult to accurately determine the quality of the crimped state only by observing the cross section of the crimped portion 3 and qualitatively evaluating a state of the cross section.

(Crimping Determination Device)

Figure 3:
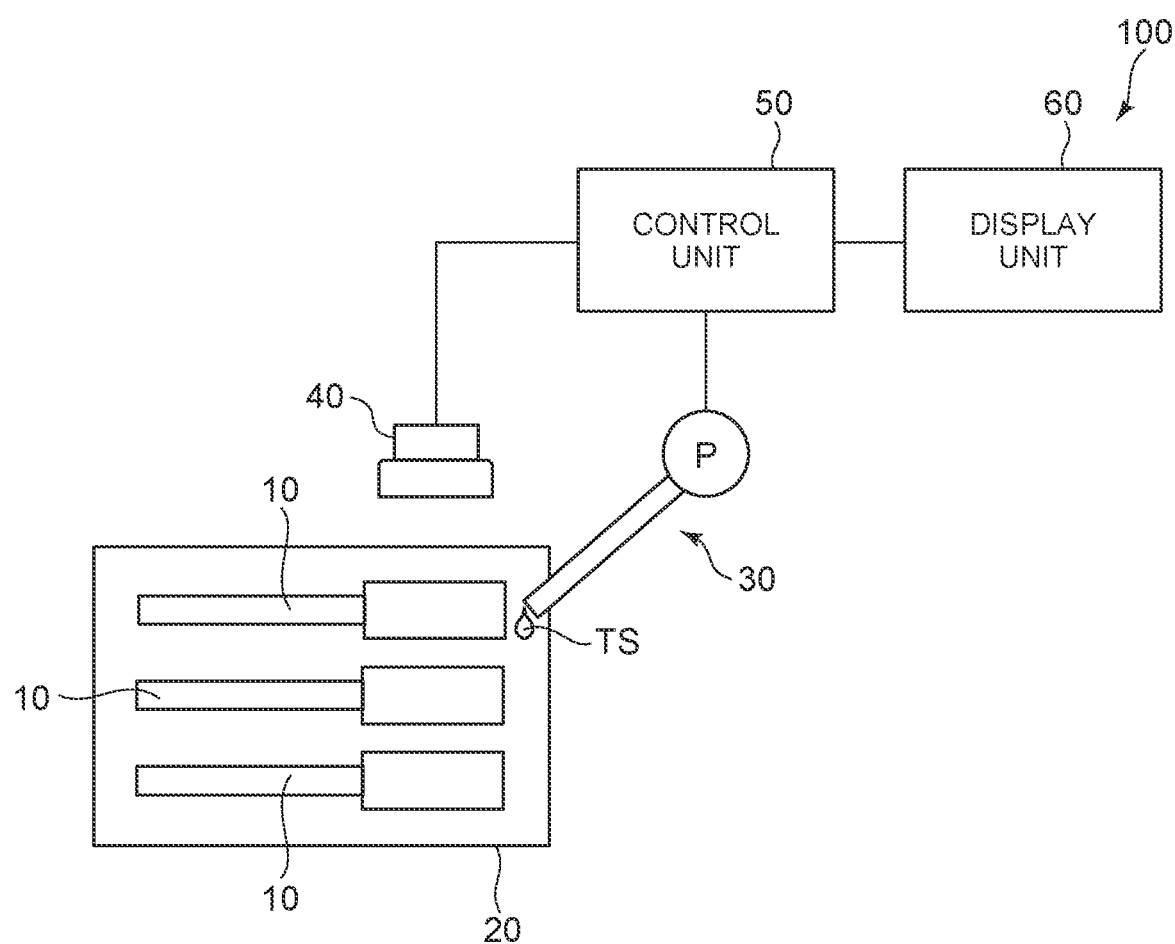
FIG. 3 is a block diagram showing a crimping determination device according to the embodiment.

FIG. 3 is a block diagram showing a crimping determination device according to the embodiment.

As shown in FIG. 3, a crimping determination device 100 according to the embodiment includes a holding unit 20, a dropping unit 30, an image acquisition unit 40, a control unit 50, and a display unit 60. The crimping determination device 100 determines the quality of the crimped state of the crimped portion 3 of the wire harness 10.

The holding unit 20 holds the wire harness 10. In the example, the holding unit 20 holds multiple wire harnesses 10. The number of the wire harnesses 10 held by the holding unit 20 may be one, or may be two or more. The holding unit 20 is, for example, a jig. The holding unit 20 is provided as necessary and can be omitted.

The dropping unit 30 drops a test solution TS having no corrosion influence on a metal to either one of the first electric wire portion 4a and the second electric wire portion 4b. The dropping unit 30 includes, for example, a pump. The test solution TS preferably contains, for example, a coloring agent. The coloring agent contains, for example, at least one of a pigment, a dye, and a fluorescent colorant. The coloring agent is, for example, a color ink. The test solution TS preferably contains, for example, an organic solvent. Examples of the organic solvent include low-viscosity organic solvents such as acetone and ethanol. The test solution TS may contain both a coloring agent and an organic solvent. The test solution TS may contain at least one of oil, a resin, a phosphor, and a resin having fluorescence characteristics.

The dropping unit 30 is electrically connected to the control unit 50. The dropping unit 30 drops the test solution TS by driving the pump in response to a command signal from the control unit 50, for example. That is, the control unit 50 controls, for example, an operation of the dropping unit 30.

The image acquisition unit 40 acquires an image including the other one of the first electric wire portion 4a and the second electric wire portion 4b. That is, the image acquisition unit 40 acquires an image including an electric wire portion to which the test solution TS is not dropped. More specifically, for example, when the dropping unit 30 drops the test solution TS to the first electric wire portion 4a, the image acquisition unit 40 acquires an image including the second electric wire portion 4b. For example, when the dropping unit 30 drops the test solution TS to the second electric wire portion 4b, the image acquisition unit 40 acquires an image including the first electric wire portion 4a. The image acquired by the image acquisition unit 40 may include at least an electric wire portion to which the test solution TS is not dropped. The image acquired by the image acquisition unit may include an electric wire portion to which the test solution TS is dropped, or may not include the electric wire portion to which the test solution TS is dropped. That is, the image acquisition unit 40 may acquire an image including both the first electric wire portion 4a and the second electric wire portion 4b. The image acquisition unit 40 is, for example, a charge coupled device (CCD) camera, an infrared camera, or a fluorescence microscope.

The image acquisition unit 40 is electrically connected to the control unit 50. The image acquisition unit 40 acquires an image in response to, for example, a command signal from the control unit 50. That is, the control unit 50 controls, for example, an operation of the image acquisition unit 40. The image acquisition unit 40 outputs data of the acquired image to the control unit 50.

The control unit 50 determines the quality of the crimped state of the crimped portion 3 based on the image output from the image acquisition unit 40. For example, the control unit 50 determines the quality of the crimped state of the crimped portion 3 based on the presence or absence of an outflow of the test solution TS in the electric wire portion to which the test solution TS is not dropped. In the case of a crimped shape as shown in FIG. 2A, the outflow does not occur, but in the case in which a gap is present in the crimped portion 3 as shown in FIG. 2B or FIG. 2C, the test solution TS flows out due to a capillary phenomenon. For example, the control unit 50 determines the quality of the crimped state of the crimped portion 3 based on an outflow rate of the test solution TS in the electric wire portion to which the test solution TS is not dropped. For example, the control unit 50 determines the quality of the crimped state of the crimped portion 3 based on a porosity of the crimped portion 3 estimated based on the outflow rate. For example, the control unit 50 may obtain the porosity of the crimped portion 3 by AI analysis based on the image, and determine the quality of the crimped state of the crimped portion 3 based on the porosity.

The control unit 50 is electrically connected to the dropping unit 30, the image acquisition unit 40, and the display unit 60. The control unit 50 controls the operation of the dropping unit 30 by, for example, outputting a command signal to the dropping unit 30. The control unit 50 controls the operation of the image acquisition unit 40 by, for example, outputting a command signal to the image acquisition unit 40. For example, the control unit 50 outputs, to the display unit 60, a determination result regarding the quality of the crimped state of the crimped portion 3.

The display unit 60 displays the determination result regarding the quality of the crimped state of the crimped portion 3. The display unit 60 is electrically connected to the control unit 50. The display unit 60 displays the determination result output from the control unit 50. The display unit 60 is, for example, a monitor. The display unit 60 is provided as necessary and can be omitted.

Figure 4A:
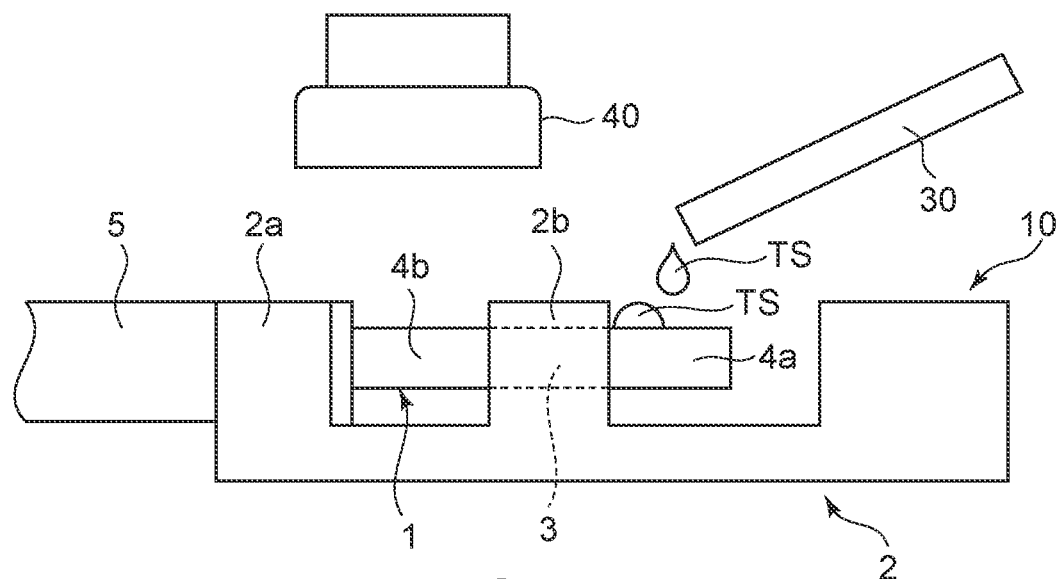
FIGS. 4A and 4B are views showing an example of the crimping determination device according to the embodiment.
Figure 4B:
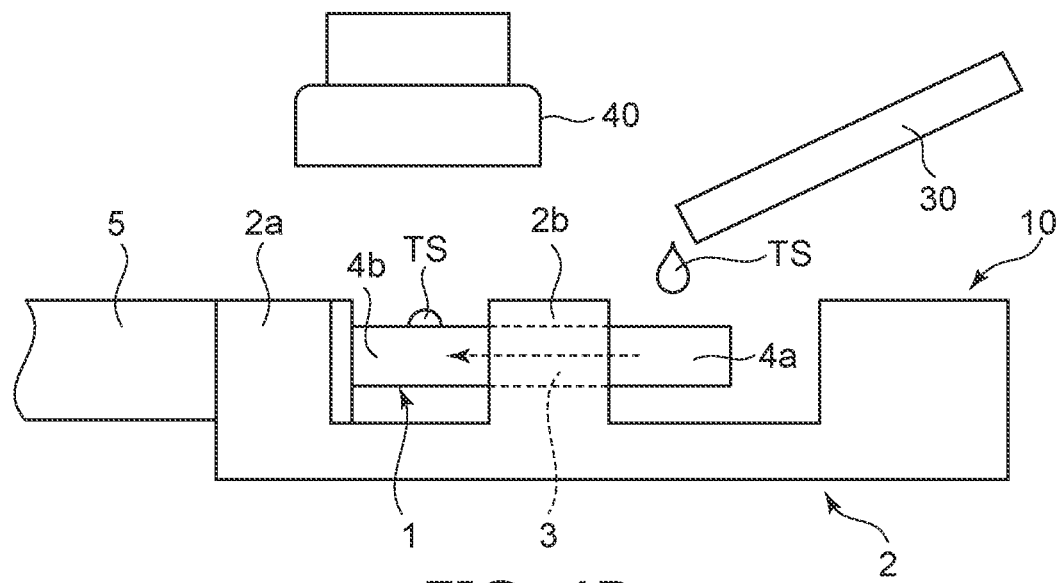

FIGS. 4A and 4B are views showing an example of the crimping determination device according to the embodiment.

As shown in FIGS. 4A and 4B, in the crimping determination device 100, for example, the test solution TS is dropped by the dropping unit 30 to the first electric wire portion 4a on the distal end side, and an image including the second electric wire portion 4b on the proximal end side is acquired by the image acquisition unit 40.

FIG. 4A is a schematic view showing a case in which the crimped state of the crimped portion 3 is good. FIG. 4B is a schematic view showing a case in which the crimped state of the crimped portion 3 is poor. As shown in FIG. 4B, in the case in which the crimped state of the crimped portion 3 is poor, when the test solution TS is dropped to the first electric wire portion 4a, the test solution TS passes through the crimped portion 3 and flows out to the second electric wire portion 4b due to the capillary phenomenon. Therefore, after the test solution TS is dropped to the first electric wire portion 4a, the test solution TS is detected in the second electric wire portion 4b. More specifically, for example, the test solution TS is detected in an image (second image) including the second electric wire portion 4b after the test solution TS is dropped to the first electric wire portion 4a.

On the other hand, as shown in FIG. 4A, in the case in which the crimped state of the crimped portion 3 is good, even when the test solution TS is dropped to the first electric wire portion 4a, the test solution TS does not pass through the crimped portion 3 and does not flow out to the second electric wire portion 4b. Therefore, after the test solution TS is dropped to the first electric wire portion 4a, the test solution TS is not detected in the second electric wire portion 4b. More specifically, for example, the test solution TS is not detected in the image (second image) including the second electric wire portion 4b after the test solution TS is dropped to the first electric wire portion 4a.

From the above, when the test solution TS is not detected in the image (second image) including the second electric wire portion 4b after the test solution TS is dropped to the first electric wire portion 4a, for example, the control unit 50 can determine that the crimped state of the crimped portion 3 is "good". When the test solution TS is detected in the second image, the control unit 50 can determine that the crimped state of the crimped portion 3 is "poor".

Figure 5A:
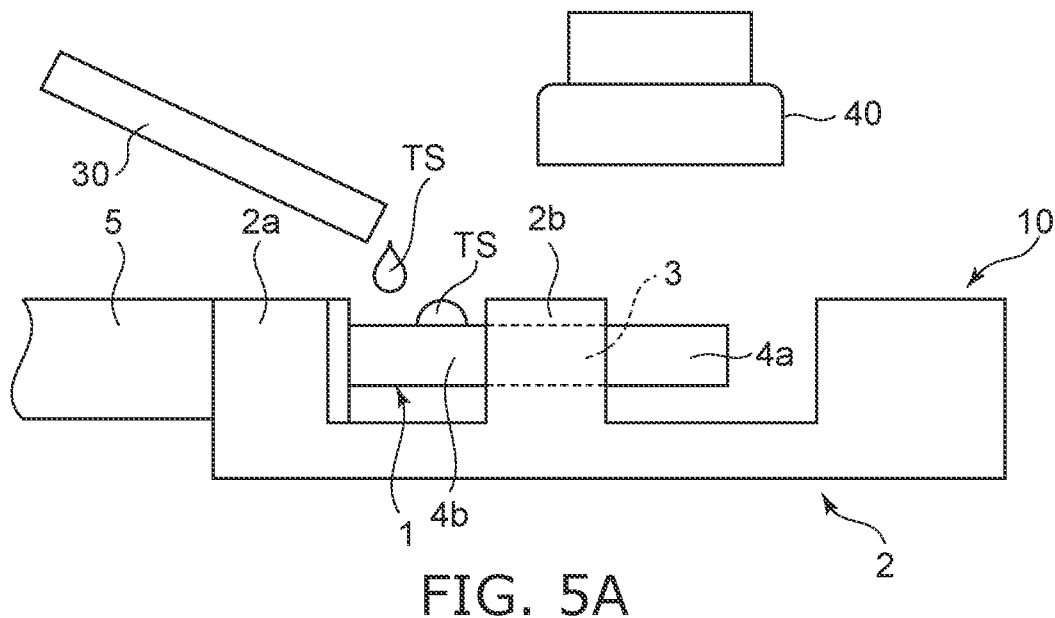
FIGS. 5A and 5B are views showing another example of the crimping determination device according to the embodiment.
Figure 5B:
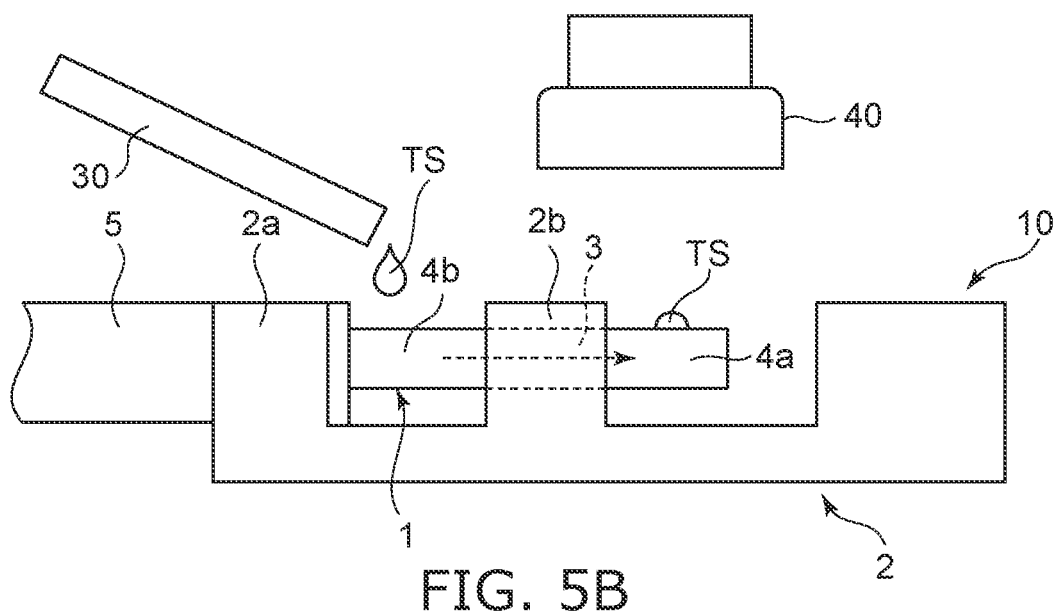

FIGS. 5A and 5B are views showing another example of the crimping determination device according to the embodiment.

As shown in FIGS. 5A and 5B, in the crimping determination device 100, for example, the test solution TS may be dropped by the dropping unit 30 to the second electric wire portion 4b on the proximal end side, and an image including the first electric wire portion 4a on the distal end side may be acquired by the image acquisition unit 40.

FIG. 5A is a schematic view showing a case in which the crimped state of the crimped portion 3 is good. FIG. 5B is a schematic view showing a case in which the crimped state of the crimped portion 3 is poor. In the example, as in the case of FIGS. 4A and 4B, when the crimped state of the crimped portion 3 is poor, the test solution TS is detected in the first electric wire portion 4a after the test solution TS is dropped to the second electric wire portion 4b (FIG. 5B). On the other hand, when the crimped state of the crimped portion 3 is good, the test solution TS is not detected in the first electric wire portion 4a after the test solution TS is dropped to the second electric wire portion 4b (FIG. 5A).

Therefore, when the test solution TS is not detected in the image (second image) including the first electric wire portion 4a after the test solution TS is dropped to the second electric wire portion 4b, for example, the control unit 50 can determine that the crimped state of the crimped portion 3 is "good". When the test solution TS is detected in the second image, the control unit 50 can determine that the crimped state of the crimped portion 3 is "poor".

As described above, the control unit 50 determines the quality of the crimped state of the crimped portion 3 based on at least an image including an electric wire portion to which the test solution TS is not dropped after the test solution TS is dropped. It is preferable that the control unit 50 determines the quality of the crimped state of the crimped portion 3 based on, for example, an image before the test solution TS is dropped and an image after the test solution TS is dropped. In this case, the image acquisition unit 40 acquires a first image which is an image before the test solution TS is dropped, and a second image which is an image after the test solution TS is dropped. Each of the first image and the second image includes the electric wire portion to which the test solution TS is not dropped. The first image and the second image are acquired, for example, at the same angle of view.

It is preferable that the control unit 50 obtains an outflow rate of the test solution TS in the other one of the first electric wire portion 4a and the second electric wire portion 4b based on, for example, the first image and the second image, and determines the quality of the crimped state of the crimped portion 3 based on the outflow rate. For example, the control unit 50 can generate a difference image indicating a change from the first image to the second image and obtain the outflow rate of the test solution TS based on the difference image. More specifically, for example, an outflow rate F is represented by a ratio of the number of pixels P2 of an electric wire portion to which the test solution TS is not dropped (the other electric wire portion) to the number of pixels P1 of an electric wire portion to which the test solution TS is dropped (one electric wire portion) in a binarized difference image (F (%)=100×P2/P1).

It is preferable that the control unit 50 obtains a porosity of the crimped portion 3 by AI analysis based on the outflow rate, and determines the quality of the crimped state of the crimped portion 3 based on the porosity. In the AI analysis, for example, the porosity is calculated using a database in which at least one of data of good products and data of defective products is stored. In the database, for example, data on the outflow rate and the porosity of the good products and the defective products is stored.

In the specification of the application, "AI analysis" is analysis using artificial intelligence (AI). In the AI analysis, the porosity is calculated by a predetermined algorithm using the data stored in the database. Here, the "predetermined algorithm" is an algorithm for estimating and calculating the porosity based on input image data indicating an outflow shape and data on the outflow rate. In the AI analysis, the porosity may be calculated based on the outflow rate and data other than the outflow rate (for example, data on manufacturing conditions and materials).

In the embodiment, for example, the porosity of the crimped portion 3 may be obtained by AI analysis based on an image in the following procedure. First, a wire harness subjected to crimping under various conditions is fabricated as a sample for teacher data. Next, an image (second image) including the second electric wire portion 4b after the test solution TS is dropped to the first electric wire portion 4a is acquired from the wire harness as the sample. In addition, from the wire harness as the sample, a cross-sectional image of the crimped portion 3 is acquired, and data on the porosity is acquired based on the cross-sectional image of the crimped portion 3. The cross-sectional image of the crimped portion 3 may be an image captured after actually cutting the crimped portion 3, or may be an image non-destructively captured by X-ray computed tomography (CT). Next, the acquired second image and the data on the porosity are associated with each other to perform machine learning, and teacher data (determination model) for determination by AI analysis is created. Then, when the determination is performed, the second image of the wire harness to be determined is acquired, and the porosity of the crimped portion 3 can be obtained by AI analysis by using the teacher data (determination model) created as described above.

(Crimping Determination Method)

Figure 6:
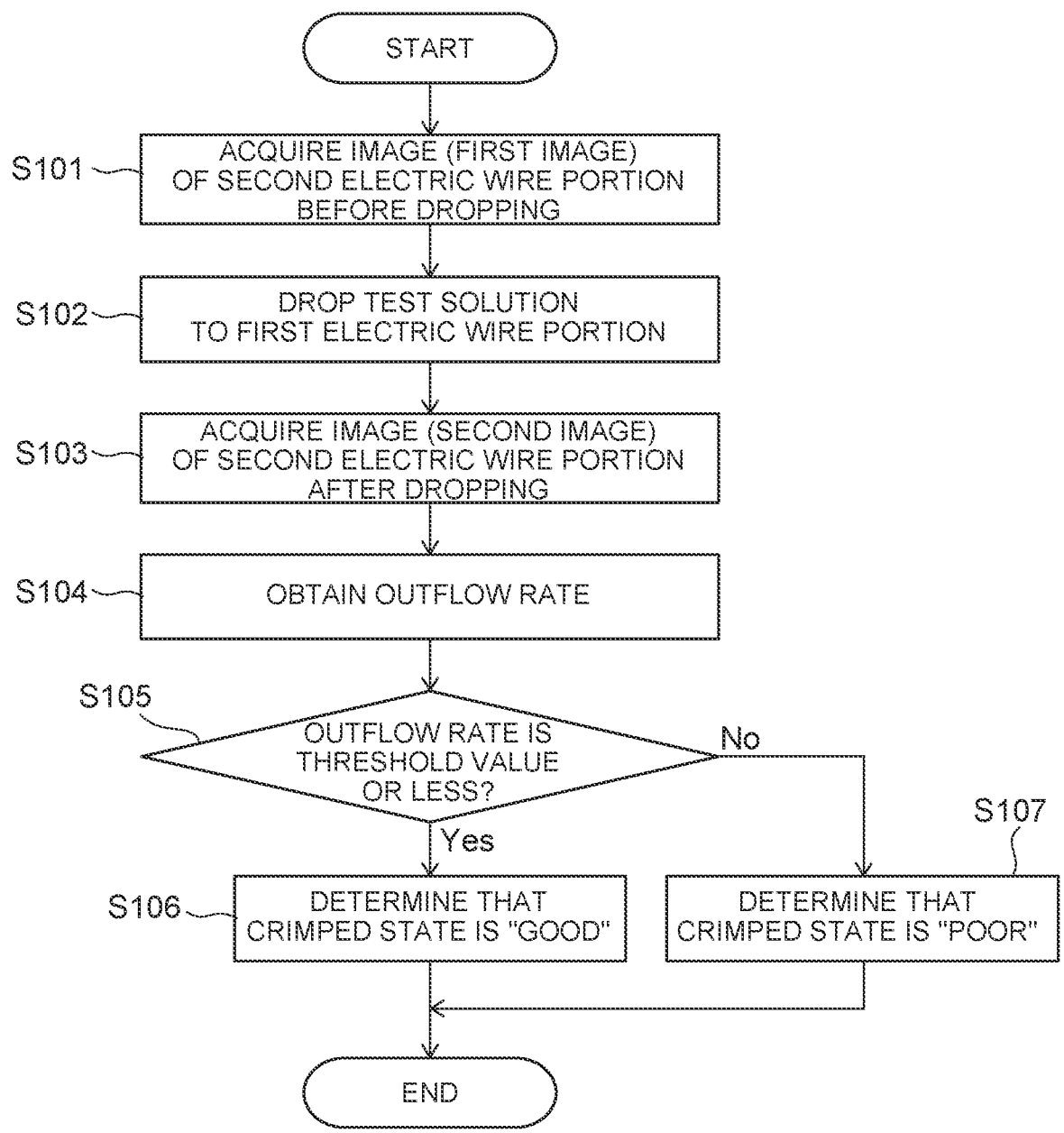
FIG. 6 is a flowchart showing an example of a crimping determination method according to the embodiment.

FIG. 6 is a flowchart showing an example of a crimping determination method according to the embodiment.

As shown in FIG. 6, in the crimping determination method according to the embodiment, first, the image acquisition unit 40 acquires an image (first image) of the second electric wire portion 4b before the test solution TS is dropped to the first electric wire portion 4a (pre-dropping image acquisition process; step S101).

Next, the dropping unit 30 drops the test solution TS to the first electric wire portion 4a (dropping process; step S102). In the dropping process, it is preferable that the test solution TS containing a coloring agent or the test solution TS containing an organic solvent is dropped. Further, the test solution TS containing both a coloring agent and an organic solvent may be dropped.

Next, the image acquisition unit 40 acquires an image (second image) of the second electric wire portion 4b after the test solution TS is dropped to the first electric wire portion 4a (post-dropping image acquisition process; step S103).

Next, an outflow rate of the test solution TS in the second electric wire portion 4b is obtained based on the first image acquired in the pre-dropping image acquisition process (step S101) and the second image acquired in the post-dropping image acquisition process (step S103) (step S104).

Next, the quality of the crimped state of the crimped portion 3 is determined based on the outflow rate obtained in step S104 (step S105). When the outflow rate is a threshold value or less (step S105: Yes), it is determined that the crimped state of the crimped portion 3 is "good" (step S106). On the other hand, when the outflow rate is more than the threshold value (step S105: No), it is determined that the crimped state of the crimped portion 3 is "poor" (step S107). Steps S104 to S107 correspond to a determination process.

The threshold value of the outflow rate can be obtained based on at least one of outflow rates of good products and outflow rates of defective products manufactured in the past, for example.

Figure 7:
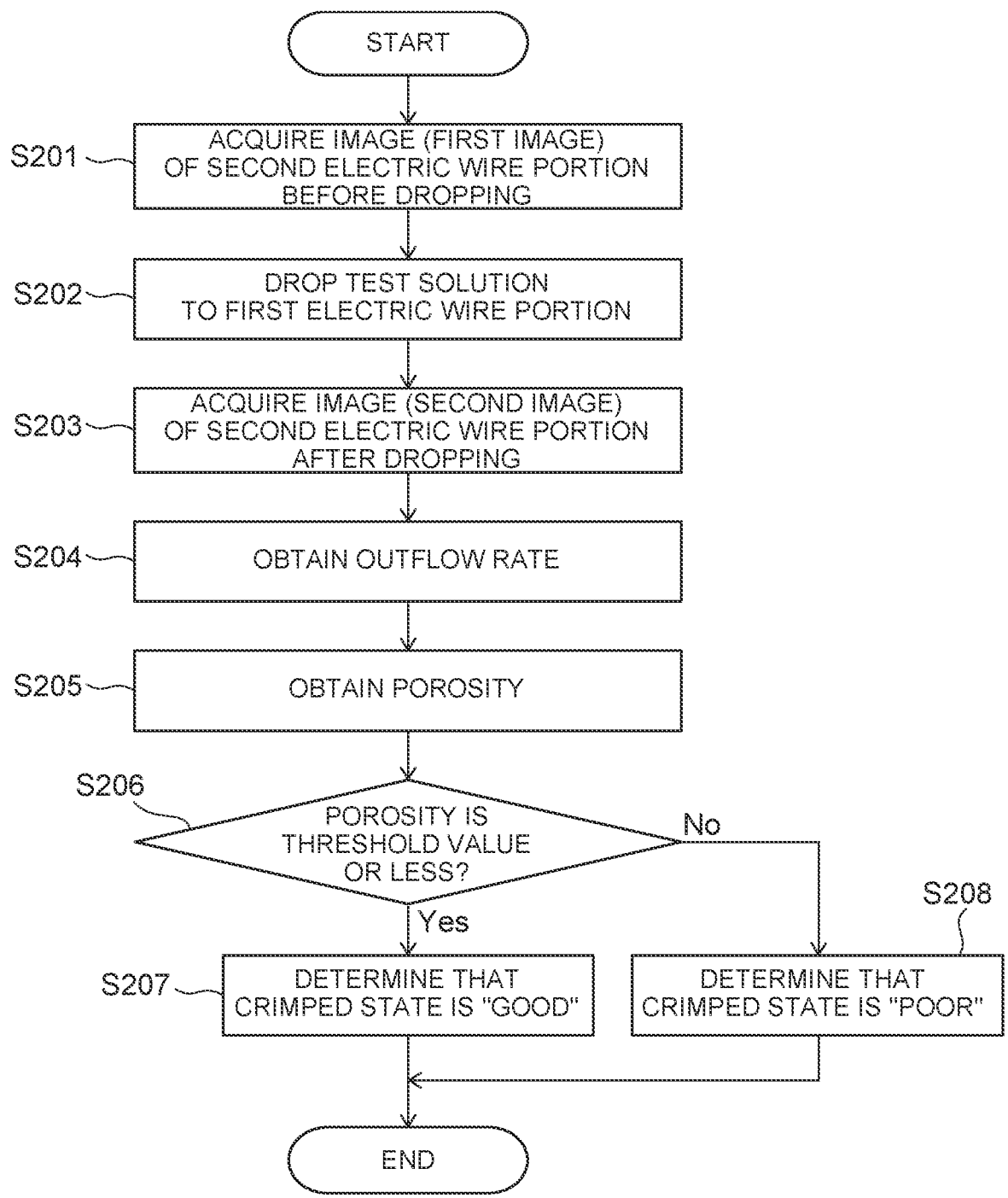
FIG. 7 is a flowchart showing another example of the crimping determination method according to the embodiment.

FIG. 7 is a flowchart showing another example of the crimping determination method according to the embodiment.

As shown in FIG. 7, in the example, in the determination process, the porosity of the crimped portion 3 is obtained by AI analysis based on the outflow rate, and the quality of the crimped state of the crimped portion 3 is determined based on the porosity.

More specifically, the first image is acquired (pre-dropping image acquisition process; step S201), the test solution TS is dropped to the first electric wire portion 4a (dropping process; step S202), the second image is acquired (post-dropping image acquisition process; step S203), and the outflow rate of the test solution TS is obtained (step S204). Steps S201 to S204 can be performed in a similar manner as steps S101 to S104 described above.

Next, based on the outflow rate obtained in step S204, the porosity of the crimped portion is obtained by AI analysis (step S205).

Next, based on the porosity obtained in step S205, the quality of the crimped state of the crimped portion 3 is determined (step S206). When the porosity is a threshold value or less (step S206: Yes), it is determined that the crimped state of the crimped portion 3 is "good" (step S207). On the other hand, when the porosity is more than the threshold value (step S206: No), it is determined that the crimped state of the crimped portion 3 is "poor" (step S208). Steps S204 to S208 correspond to a determination process.

The threshold value of the porosity can be obtained based on at least one of porosities of good products and porosities of defective products manufactured in the past, for example.

In the examples of FIGS. 6 and 7, a case has been described in which the test solution TS is dropped to the first electric wire portion 4a in the dropping process, and images of the second electric wire portion 4b are acquired in the pre-dropping image acquisition process and the post-dropping image acquisition process. Alternatively, as described above, the test solution TS may be dropped to the second electric wire portion 4b in the dropping process, and images of the first electric wire portion 4a may be acquired in the pre-dropping image acquisition process and the post-dropping image acquisition process.

(Crimping Determination Program)

In the embodiment, the above-described crimping determination method may be provided as a program. In other words, in the embodiment, it is possible to provide a crimping determination program including the dropping process, the post-dropping image acquisition process, and the determination process. The crimping determination program may further include the pre-dropping image acquisition process.

(Recording Medium)

In the embodiment, it is possible to provide a recording medium (non-transitory computer readable storage medium) in which the crimping determination program is recorded. The recording medium is readable at least by a computer. The recording medium may be read-only or may be both readable and writable.

Hereinafter, the crimping determination device and the crimping determination method according to the embodiment will be described in more detail with reference to Experimental Examples 1 to 4.

Figure 8A:
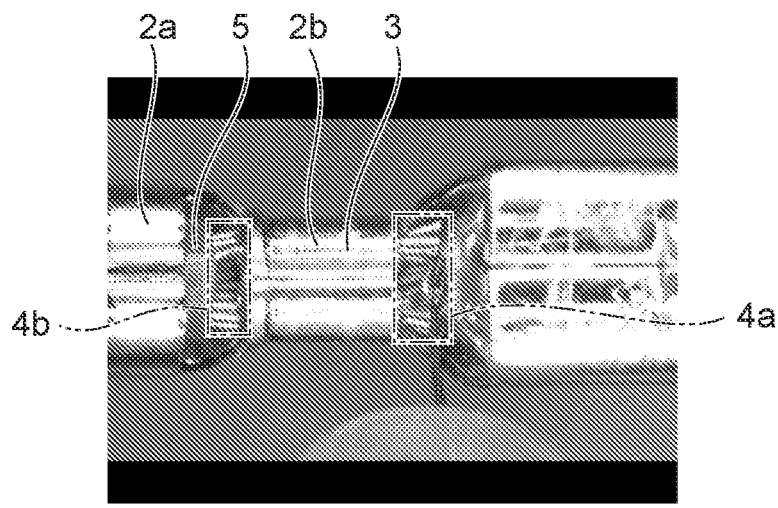
FIGS. 8A to 8C are images showing data of Experimental Example 1.
Figure 8B:
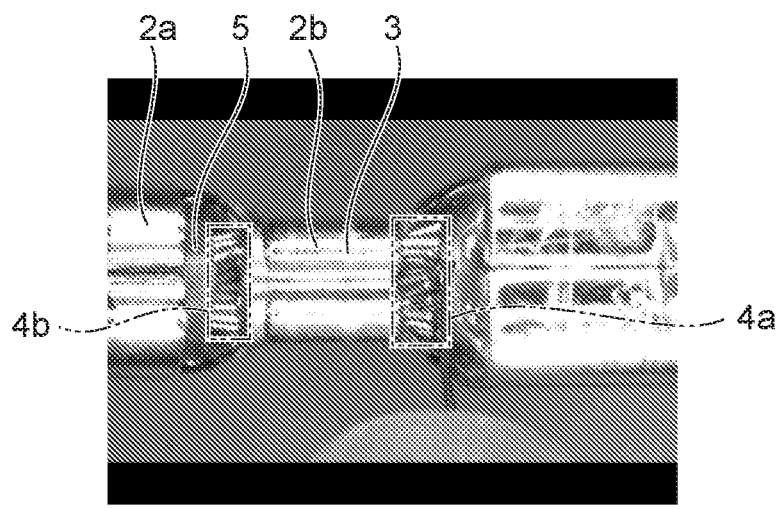
Figure 8C:
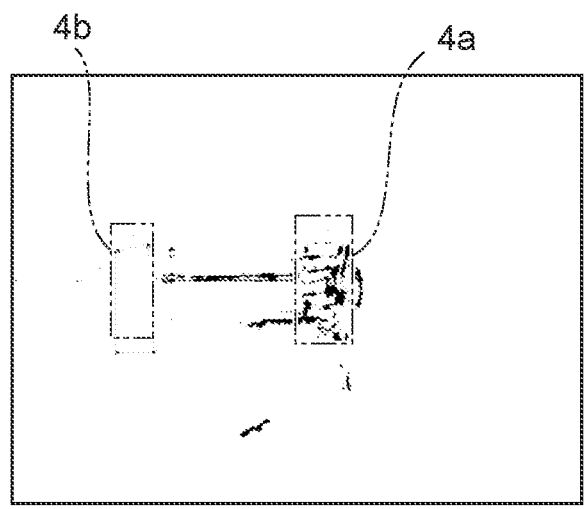

FIGS. 8A to 8C are images showing data of Experimental Example 1.

Figure 9A:
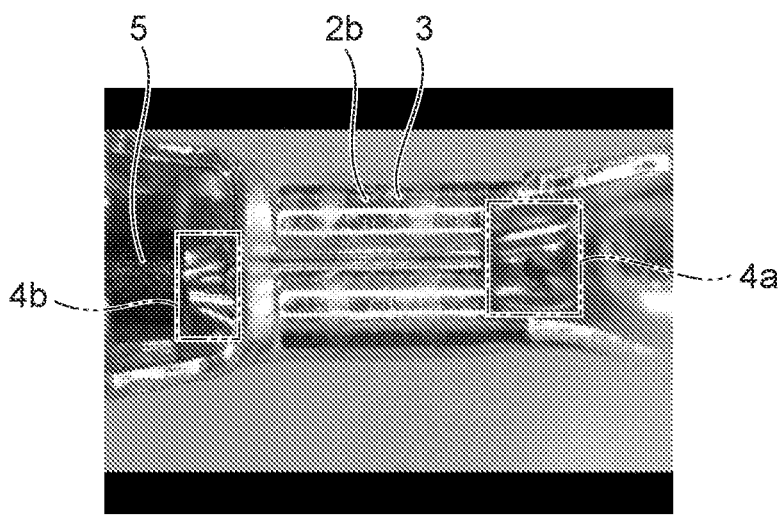
FIGS. 9A to 9C are images showing data of Experimental Example 2.
Figure 9B:
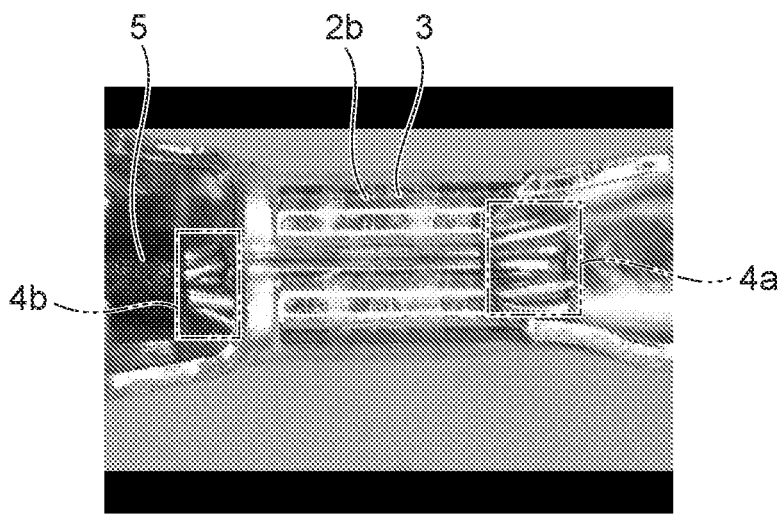
Figure 9C:
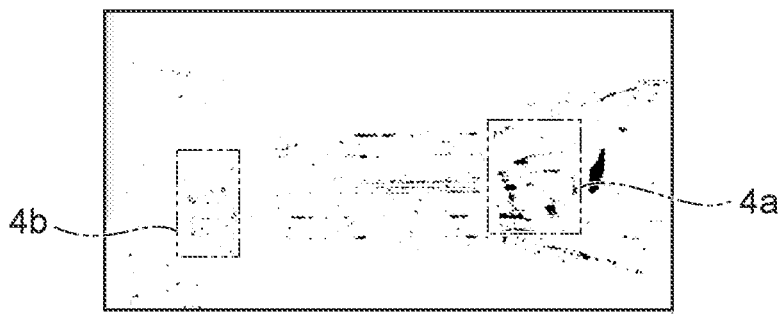

FIGS. 9A to 9C are images showing data of Experimental Example 2.

Figure 10A:
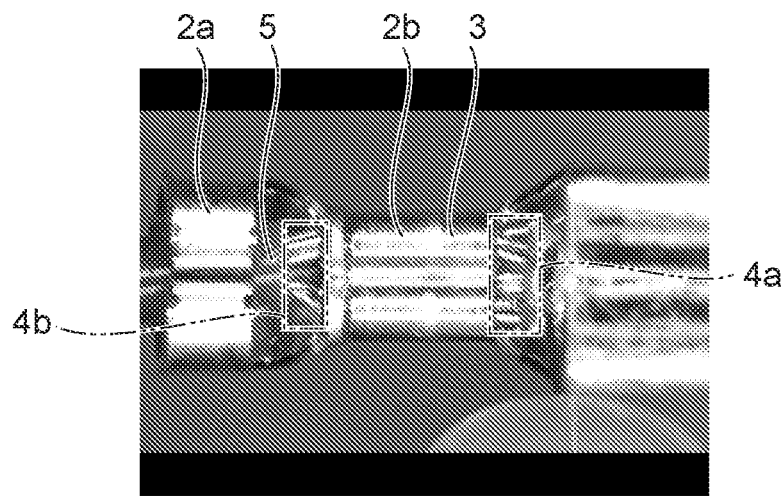
FIGS. 10A to 10C are images showing data of Experimental Example 3.
Figure 10B:
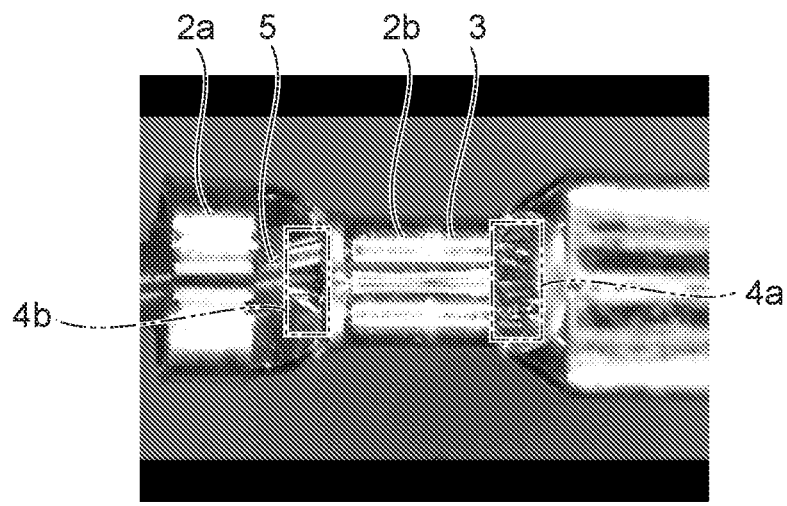
Figure 10C:
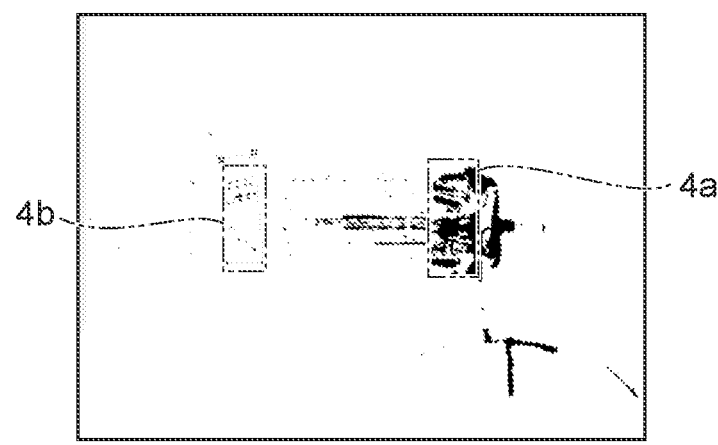

FIGS. 10A to 10C are images showing data of Experimental Example 3.

Figure 11A:
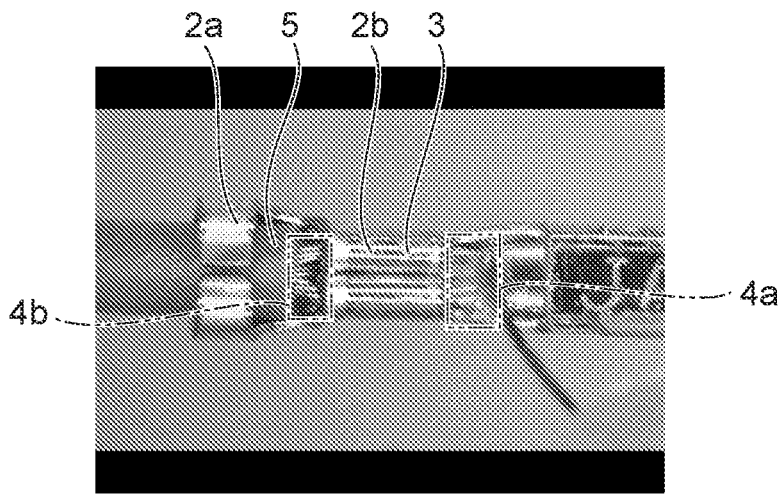
FIGS. 11A to 11C are images showing data of Experimental Example 4.
Figure 11B:
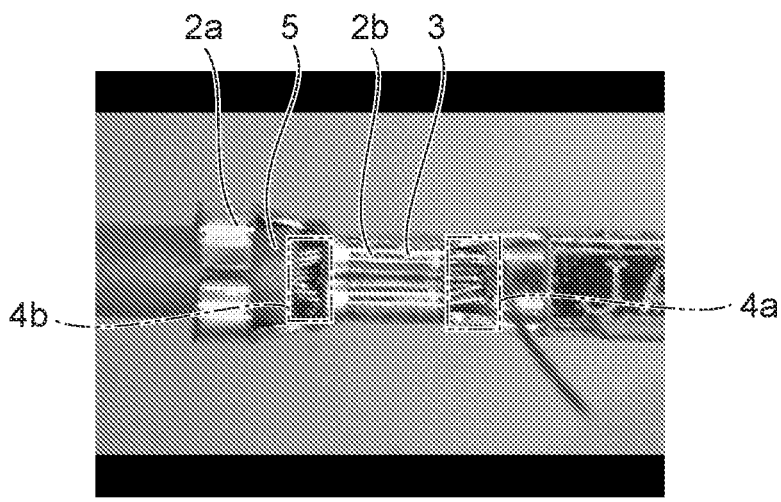
Figure 11C:
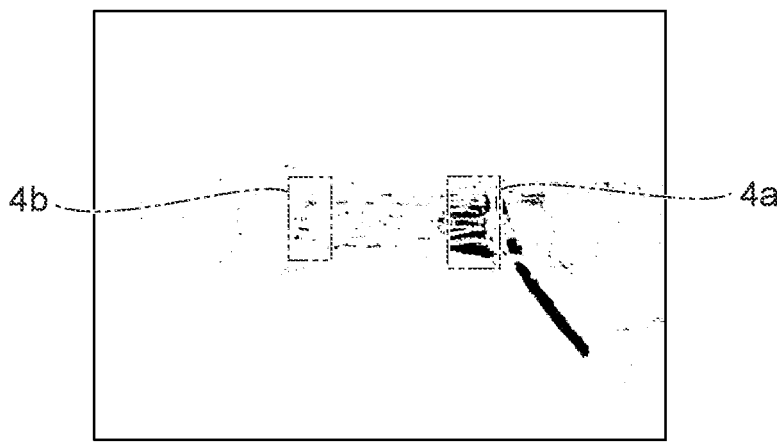

FIGS. 11A to 11C are images showing data of Experimental Example 4.

Figures 12A, 12B:
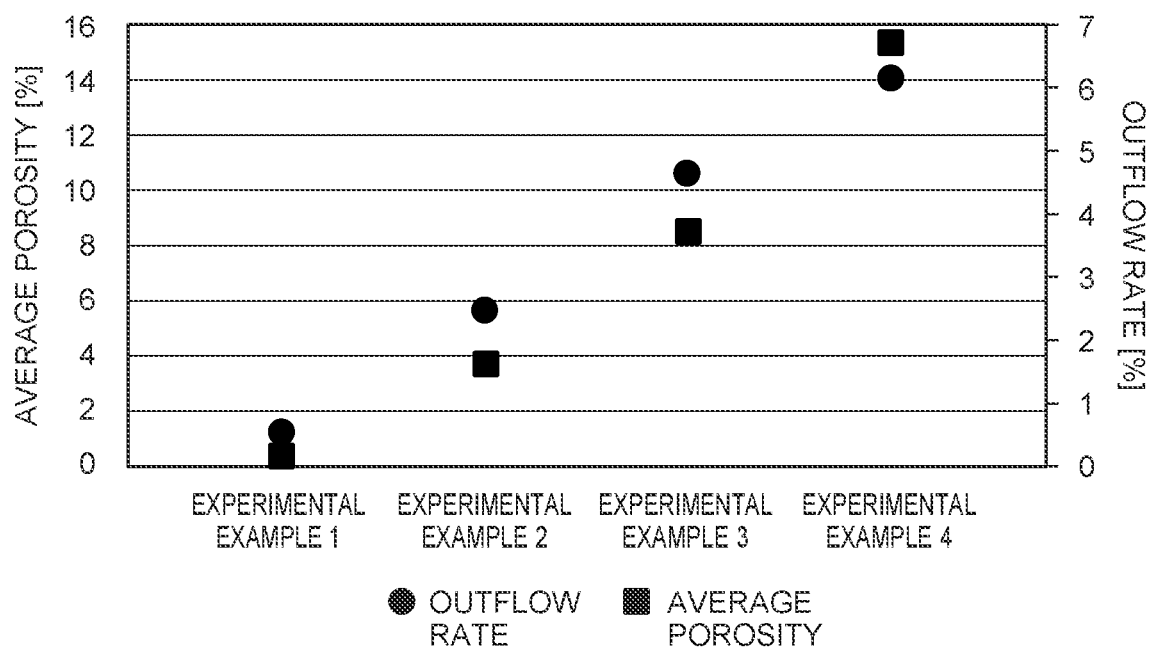
FIGS. 12A and 12B are respectively a table and a graph showing data of Experimental Examples 1 to 4.

FIGS. 12A and 12B are respectively a table and a graph showing data of Experimental Examples 1 to 4.

In Experimental Examples 1 to 4, the first image before the test solution TS was dropped to the first electric wire portion 4a was acquired, the test solution TS was dropped to the first electric wire portion 4a, and the second image after the test solution TS was dropped to the first electric wire portion 4a was acquired.

FIG. 8A, FIG. 9A, FIG. 10A, and FIG. 11A are first images in Experimental Examples 1 to 4, respectively. FIG. 8B, FIG. 9B, FIG. 10B, and FIG. 11B are second images in Experimental Examples 1 to 4, respectively. FIG. 8C, FIG. 9C, FIG. 10C, and FIG. 11C are difference images each showing a change from the first image to the second image in Experimental Examples 1 to 4, respectively. The difference image is a binary image obtained by subtracting the first image from the second image.

In FIGS. 8A to 8C, FIGS. 9A to 9C, FIGS. 10A to 10C, and FIGS. 11A to 11C, the first electric wire portion 4a and the second electric wire portion 4b are indicated by two-dot chain lines.

In Experimental Examples 1 to 4, the number of pixels in the first electric wire portion 4a and the number of pixels in the second electric wire portion 4b are obtained from the difference images. Results are shown in a table in FIG. 12A. In Experimental Examples 1 to 4, the outflow rate is obtained based on the number of pixels in the first electric wire portion 4a and the number of pixels in the second electric wire portion 4b. Results are shown in the table in FIG. 12A.

In Experimental Examples 1 to 4, an average porosity is calculated based on cross-section images of 20 samples of the same lot used in Experimental Examples 1 to 4. In addition, an average porosity of the crimped portion 3 may be obtained by capturing images of the crimped portion 3 by X-ray CT. Results are shown in the table in FIG. 12A. In Experimental Examples 1 to 4, the outflow rate and the average porosity are plotted on a graph in FIG. 12B.

As shown in FIGS. 12A and 12B, it is suggested that the outflow rate and the average porosity correlate with each other in Experimental Examples 1 to 4. More specifically, in Experimental Example 1 in which the average porosity is about 0.4% and the crimped state is good, the outflow rate is about 0.5%. On the other hand, in Experimental Example 2 in which the average porosity is about 3.5% and the crimped state is poor, the outflow rate is about 2.4%. Similarly, in Experimental Example 3 in which the average porosity is about 8.5% and the crimped state is poor, the outflow rate is about 4.6%. Similarly, in Experimental Example 4 in which the average porosity is about 15.5% and the crimped state is poor, the outflow rate is about 6.2%.

Based on the results, it is suggested that when the outflow rate is low, the crimped state can be determined to be good, and when the outflow rate is high, the crimped state can be determined to be poor. More specifically, it is suggested that, for example, when the outflow rate is 2% or less, preferably 1% or less, and more preferably 0.5% or less, the crimped state can be determined to be good. The threshold value of the outflow rate used for the determination of the quality may be set as appropriate in accordance with, for example, a performance required for the wire harness 10.

Since the outflow rate and the average porosity correlate with each other, it is suggested that the porosity can be estimated based on the outflow rate. More specifically, for example, a graph with the outflow rate on a horizontal axis and the average porosity on a vertical axis is created based on measurement results of the outflow rate and the average porosity of multiple samples, and a porosity corresponding to the calculated outflow rate can be estimated based on the obtained calibration curve.

Hereinafter, functions and effects of the crimping determination device, the crimping determination method, the crimping determination program, and the recording medium according to the embodiment will be described.

In the case of manufacturing a wire harness, it is required to prevent a wire harness having a crimping failure from being shipped. More specifically, for example, it is required to screen a wire harness having a crimping failure by determining a quality of a crimped state.

To cope with this, according to the embodiment, it is possible to easily determine the quality of the crimped state by dropping the test solution TS to one electric wire portion (for example, the first electric wire portion 4a) and performing a determination based on an image of the other electric wire portion (for example, the second electric wire portion 4b) after dropping. According to the embodiment, unlike the case in which the determination is performed by observing a cross-sectional shape of the crimped portion 3, it is possible to perform the determination without destroying the wire harness 10. Therefore, for example, the wire harness 10 after the determination can be used as it is. Since the determination can be performed in a non-destructive manner, the wire harness 10 can be applied to, for example, total inspection in a manufacturing process, and the presence or absence of the inspection and the basis of the determination result can be confirmed on a product by observing an appearance of the product.

By dropping the test solution TS to the first electric wire portion 4a and acquiring the image of the second electric wire portion 4b, it is possible to prevent the test solution TS from flowing to a portion on the proximal end side with respect to the second electric wire portion 4b (for example, a portion covered by the covering member 5). Accordingly, an influence of the test solution TS on the wire harness 10 after the determination can be further reduced.

By obtaining the outflow rate of the test solution TS based on the first image and the second image and performing a determination based on the outflow rate, the quality of the crimped state can be determined more accurately.

By obtaining the porosity based on the outflow rate of the test solution TS and performing a determination based on the porosity, the quality of the crimped state can be determined more accurately.

By dropping the test solution TS containing a coloring agent, the quality of the crimped state can be determined more easily as compared with the case of using the test solution TS containing no coloring agent.

By dropping the test solution TS containing an organic solvent, the test solution TS can be easily removed after the determination by a method such as evaporation of the test solution TS. Accordingly, an influence of the test solution TS on the wire harness 10 after the determination can be further reduced.

As described above, according to the embodiment, there are provided a crimping determination device, a crimping determination method, a crimping determination program, and a recording medium capable of reducing an outflow of a wire harness having a crimping failure to the market.

(Wire Harness Processing Device)

Figure 13:
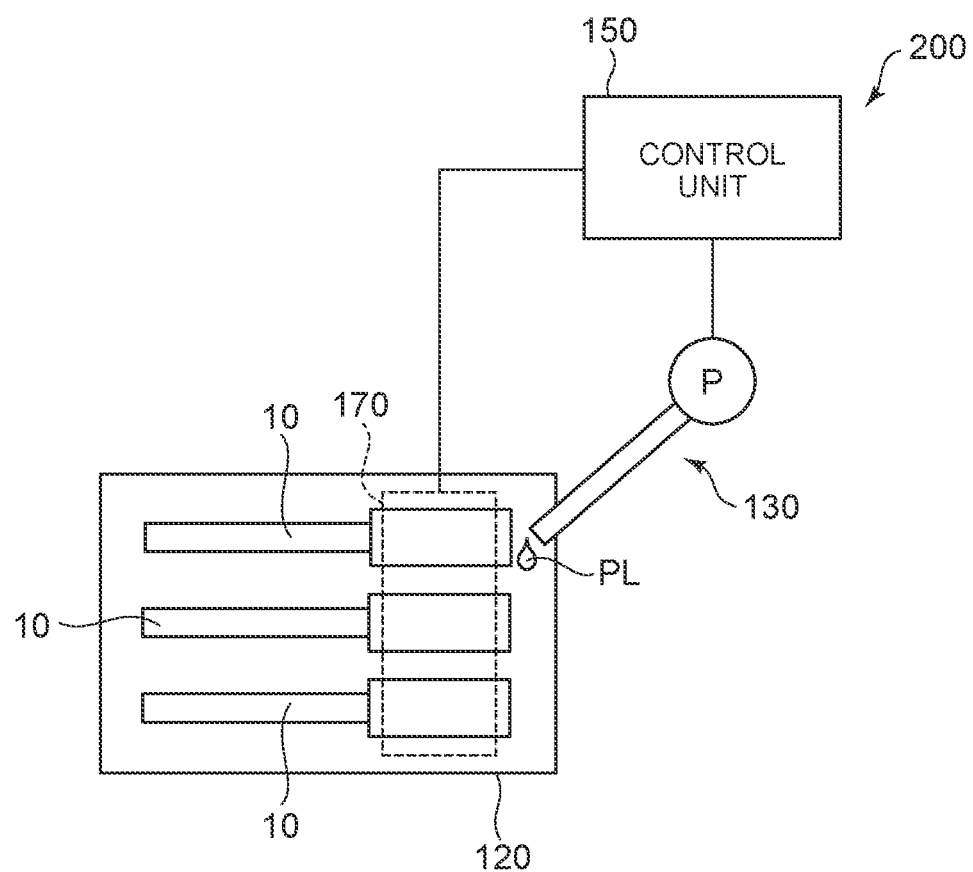
FIG. 13 is a block diagram showing a wire harness processing device according to the embodiment.

FIG. 13 is a block diagram showing a wire harness processing device according to the embodiment.

As shown in FIG. 13, a wire harness processing device 200 according to the embodiment includes a holding unit 120, a dropping unit 130, a control unit 150, and a heating unit 170. The wire harness processing device 200 processes the periphery of the crimped portion 3 of the wire harness 10.

The holding unit 120 holds the wire harness 10. In the example, the holding unit 120 holds multiple wire harnesses 10. The number of the wire harnesses 10 held by the holding unit 120 may be one, or may be two or more. The holding unit 120 is, for example, a jig. The holding unit 120 is provided as necessary and can be omitted.

The dropping unit 130 drops a processing liquid PL to either one of the first electric wire portion 4a and the second electric wire portion 4b. The dropping unit 130 includes, for example, a pump. The processing liquid PL contains a thermosetting resin having a low viscosity. Examples of the thermosetting resin include an epoxy resin. The processing liquid PL preferably contains, for example, a coloring agent. The coloring agent contains, for example, at least one of a pigment, a dye, and a fluorescent colorant. The coloring agent is, for example, a color ink.

The dropping unit 130 is electrically connected to the control unit 150. The dropping unit 130 drops the processing liquid PL by driving the pump in response to a command signal from the control unit 150, for example. That is, the control unit 150 controls, for example, an operation of the dropping unit 130.

The heating unit 170 heats the processing liquid PL dropped from the dropping unit 130 to cure the processing liquid PL. The heating unit 170 is provided around the first electric wire portion 4a and the second electric wire portion 4b. The heating unit 170 is, for example, a sheathed heater, a hot plate, or a panel heater suitable for local heating.

The heating unit 170 is electrically connected to the control unit 150. The heating unit 170 heats the periphery of the first electric wire portion 4a and the second electric wire portion 4b in response to a command signal from the control unit 150, for example. That is, the control unit 150 controls, for example, an operation of the heating unit 170.

The control unit 150 is electrically connected to the dropping unit 130 and the heating unit 170. For example, the control unit 150 controls the operation of the dropping unit 130 by outputting a command signal to the dropping unit 130. For example, the control unit 150 controls the operation of the heating unit 170 by outputting a command signal to the heating unit 170.

Figure 14A:
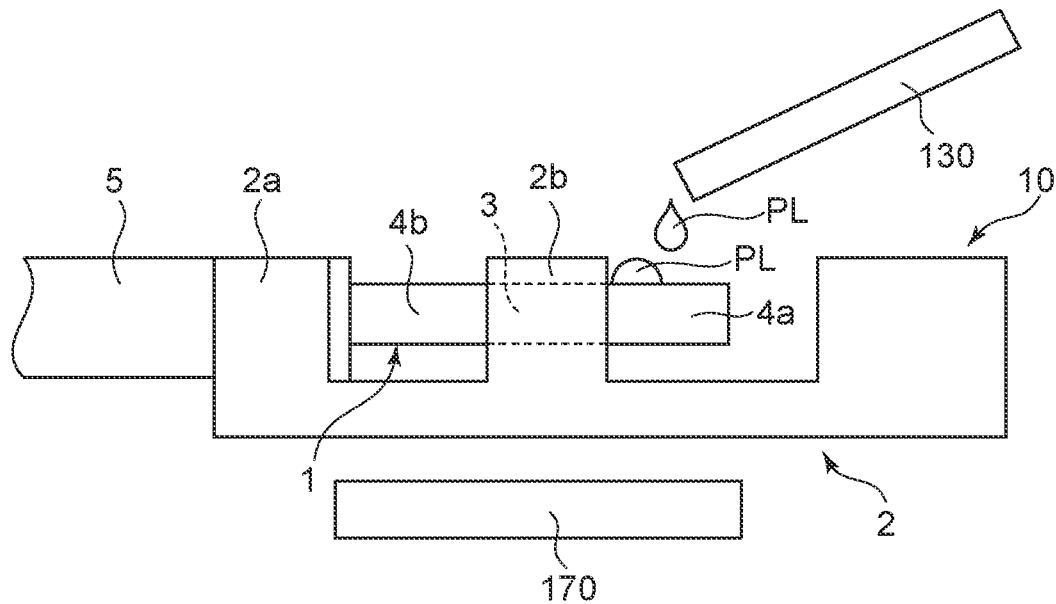
FIGS. 14A and 14B are views showing an example of the wire harness processing device according to the embodiment.
Figure 14B:
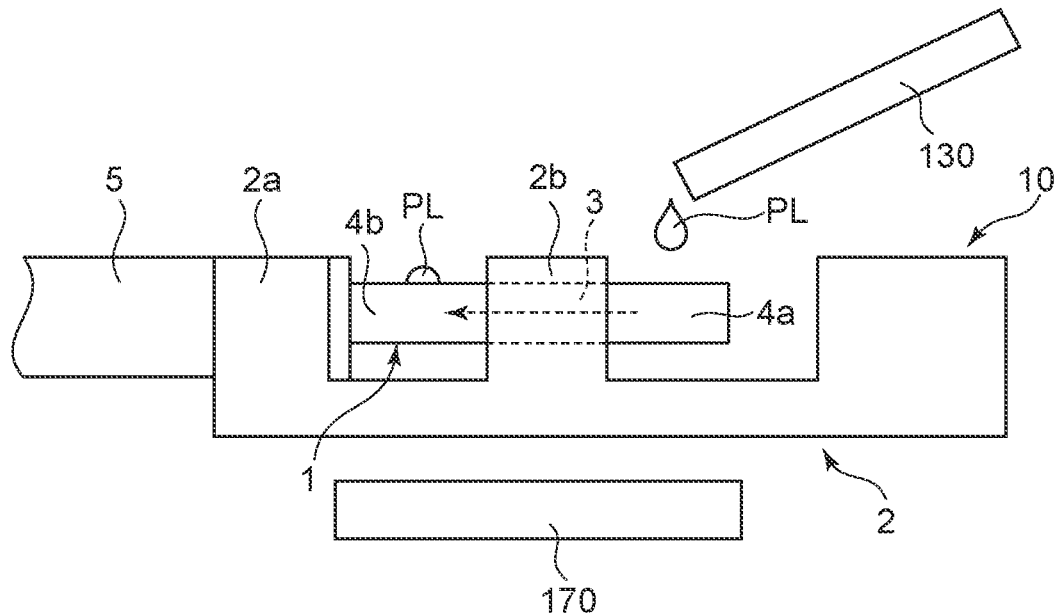

FIGS. 14A and 14B are views showing an example of the wire harness processing device according to the embodiment.

As shown in FIGS. 14A and 14B, in the wire harness processing device 200, for example, the processing liquid PL is dropped by the dropping unit 130 to the first electric wire portion 4a on the distal end side.

FIG. 14A is a schematic view showing a case in which the crimped state of the crimped portion 3 is good. FIG. 14B is a schematic view showing a case in which the crimped state of the crimped portion 3 is poor. As shown in FIG. 14B, in the case in which the crimped state of the crimped portion 3 is poor, when the processing liquid PL is dropped to the first electric wire portion 4a, the processing liquid PL passes through the crimped portion 3 and flows out to the second electric wire portion 4b due to the capillary phenomenon. Then, when the processing liquid PL is heated by the heating unit 170, the processing liquid PL is cured in the first electric wire portion 4a, the second electric wire portion 4b, and the crimped portion 3.

On the other hand, as shown in FIG. 14A, in the case in which the crimped state of the crimped portion 3 is good, even when the processing liquid PL is dropped to the first electric wire portion 4a, the processing liquid PL does not pass through the crimped portion 3 and does not flow out to the second electric wire portion 4b. Then, when the processing liquid PL is heated by the heating unit 170, the processing liquid PL is cured in the first electric wire portion 4a.

Figure 15A:
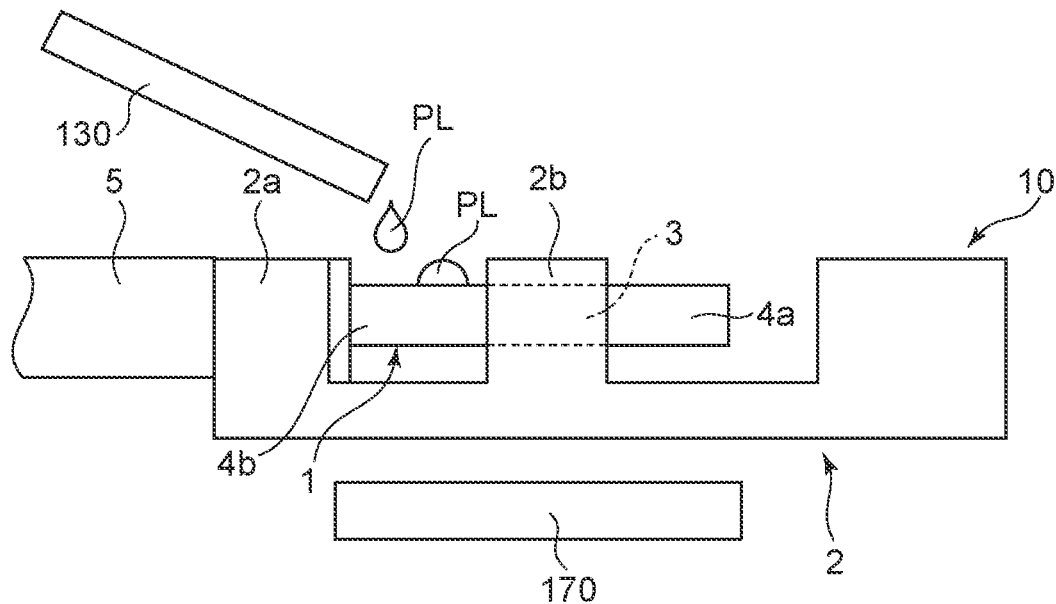
FIGS. 15A and 15B are views showing another example of the wire harness processing device according to the embodiment.
Figure 15B:
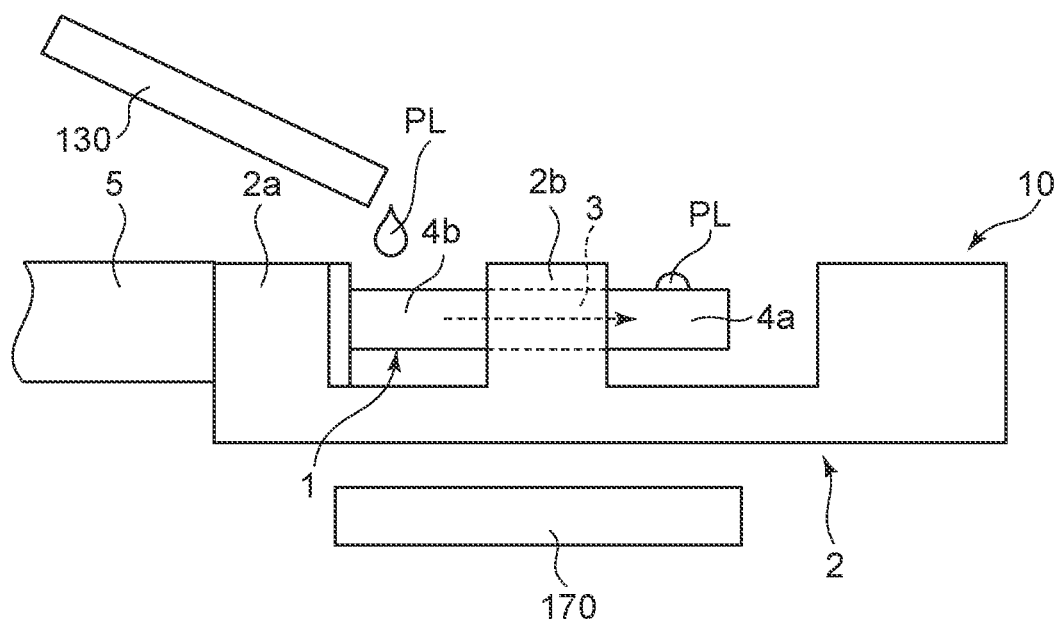

FIGS. 15A and 15B are views showing another example of the wire harness processing device according to the embodiment.

As shown in FIGS. 15A and 15B, in the wire harness processing device 200, for example, the processing liquid PL may be dropped by the dropping unit 130 to the second electric wire portion 4b on the proximal end side.

FIG. 15A is a schematic view showing a case in which the crimped state of the crimped portion 3 is good. FIG. 15B is a schematic view showing a case in which the crimped state of the crimped portion 3 is poor. In the example, as in the case of FIGS. 14A and 14B, in the case in which the crimped state of the crimped portion 3 is poor, when the processing liquid PL is dropped to the second electric wire portion 4b and then heated by the heating unit 170, the processing liquid PL is cured in the first electric wire portion 4a, the second electric wire portion 4b, and the crimped portion 3 (FIG. 15B). On the other hand, in the case in which the crimped state of the crimped portion 3 is good, when the processing liquid PL is dropped to the second electric wire portion 4b and then heated by the heating unit 170, the processing liquid PL is cured in the second electric wire portion 4b (FIG. 15A).

(Wire Harness Processing Method)

Figure 16:
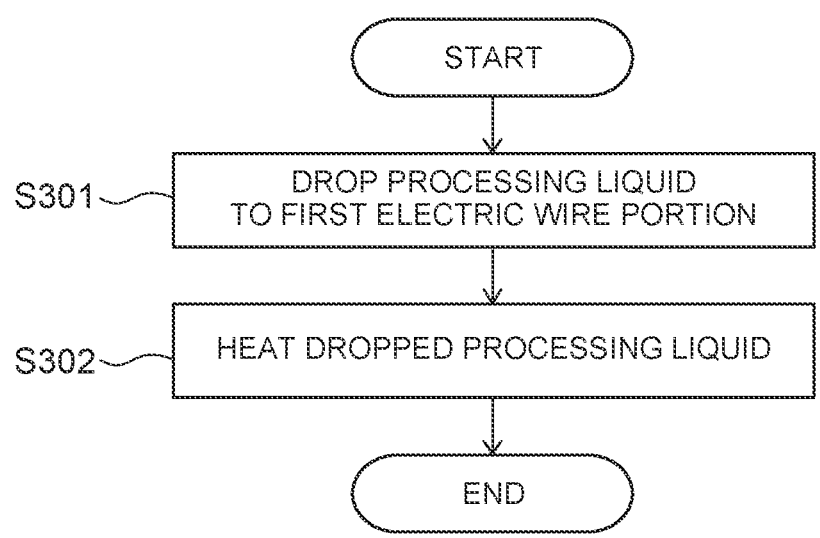
FIG. 16 is a flowchart showing an example of a wire harness processing method according to the embodiment.

FIG. 16 is a flowchart showing an example of a wire harness processing method according to the embodiment.

As shown in FIG. 16, in the crimping determination method according to the embodiment, first, the dropping unit 130 drops the processing liquid PL to the first electric wire portion 4a (dropping process; step S301). In the dropping process, the processing liquid PL containing a thermosetting resin is dropped. In the dropping process, the processing liquid PL containing a coloring agent is preferably dropped.

Next, the heating unit 170 heats the processing liquid PL dropped in the dropping process for curing (heating process; step S302).

Hereinafter, functions and effects of the wire harness processing device and the wire harness processing method according to the embodiment will be described.

In the case of manufacturing a wire harness, it is required to prevent a wire harness having a crimping failure from being shipped. More specifically, for example, it is required to improve a crimped state by processing the wire harness having a crimping failure.

To cope with this, according to the embodiment, the processing liquid PL is dropped to one electric wire portion (for example, the first electric wire portion 4a) and heated by the heating unit 170. Therefore, when the crimped state of the crimped portion 3 is poor, the processing liquid PL can be cured in the first electric wire portion 4a, the second electric wire portion 4b, and the crimped portion 3 to fill a gap. Accordingly, when the crimped state of the crimped portion 3 is poor, the crimped state can be improved.

By dropping the processing liquid PL to the first electric wire portion 4a, it is possible to prevent the processing liquid PL from flowing to a portion on the proximal end side with respect to the second electric wire portion 4b (for example, a portion covered by the covering member 5). Accordingly, an unintended influence of the processing liquid PL on the processed wire harness 10 can be further reduced.

By dropping the processing liquid PL containing a coloring agent, the processed wire harness 10 can be identified more easily. For example, in the wire harness 10 after processing, it is possible to determine whether the crimped state is good from the beginning or whether the crimped state is improved by processing. For example, when the processing liquid PL is dropped to the first electric wire portion 4a, if the processing liquid PL after curing is present only on the first electric wire portion 4a, it can be determined that the crimped state is good from the beginning. On the other hand, for example, when the processing liquid PL is dropped to the first electric wire portion 4a, if the processing liquid PL after curing is present on both the first electric wire portion 4a and the second electric wire portion 4b, it can be determined that the crimped state is improved by the processing. Accordingly, quality control can be performed more easily.

As described above, according to the embodiment, there are provided a wire harness processing device and a wire harness processing method capable of reducing an outflow of a wire harness having a crimping failure to the market.

The crimping determination device according to the embodiment may also serve as the wire harness processing device according to the embodiment. For example, by using the test solution TS containing a thermosetting resin, it is possible to determine the quality of the crimped state, and to improve the crimped state when the crimped state is poor. That is, it is possible to simultaneously determine the quality of the crimped state and improve the crimped state.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions. Embodiments described above can be implemented in combination with each other.

What is claimed is:

1. A crimping determination device configured to determine a quality of a crimped state of a wire harness in which a crimping terminal is crimped to an electric wire, the device comprising:
    a dropping unit configured to drop a test solution to the wire harness, the wire harness including a crimped portion in which the electric wire is crimped by the crimping terminal, a first electric wire portion in which the electric wire is exposed on a distal end side with respect to the crimped portion, and a second electric wire portion in which the electric wire is exposed on a proximal end side with respect to the crimped portion, the dropping unit being configured to drop the test solution to either one of the first electric wire portion and the second electric wire portion;
    an image acquisition unit acquires a first image before the test solution is dropped, and acquires a second image after the test solution is dropped, and
    a control unit obtains an outflow rate of the test solution in the other one of the first electric wire portion and the second electric wire portion based on the first image and the second image, and determines the quality of the crimped state of the crimped portion based on the outflow rate.

2. The device according to claim 1, wherein
the dropping unit drops the test solution to the first electric wire portion, and
the image acquisition unit acquires an image including the second electric wire portion.

3. The device according to claim 1, wherein
the control unit obtains a porosity of the crimped portion by AI analysis based on the outflow rate, and determines the quality of the crimped state of the crimped portion based on the porosity.

4. The device according to claim 1, wherein
the control unit obtains a porosity of the crimped portion by AI analysis based on the image, and determines the quality of the crimped state of the crimped portion based on the porosity.

5. The device according to claim 1, wherein
the dropping unit drops the test solution containing a coloring agent.

6. The device according to claim 1, wherein
the dropping unit drops the test solution containing an organic solvent.

7. A crimping determination method for determining a quality of a crimped state of a wire harness in which a crimping terminal is crimped to an electric wire, the method comprising:
    a dropping process of dropping a test solution to the wire harness, the wire harness including a crimped portion in which the electric wire is crimped by the crimping terminal, a first electric wire portion in which the electric wire is exposed on a distal end side with respect to the crimped portion, and a second electric wire portion in which the electric wire is exposed on a proximal end side with respect to the crimped portion, the test solution being dropped to either one of the first electric wire portion and the second electric wire portion in the dropping process;
    a pre-dropping image acquisition process of acquiring an image including the other one of the first electric wire portion and the second electric wire portion before the dropping process, in the pre-dropping image acquisition process, a first image before the test solution is dropped being acquired,
in the post-dropping image acquisition process, a second image after the test solution is dropped being acquired, and
a determination process, an outflow rate of the test solution in the other one of the first electric wire portion and the second electric wire portion being obtained based on the first image and the second image, and the quality of the crimped state of the crimped portion being determined based on the outflow rate.

8. The method according to claim 7, wherein
in the dropping process, the test solution is dropped to the first electric wire portion, and
in the post-dropping image acquisition process, an image including the second electric wire portion is acquired.

9. The method according to claim 7, wherein
in the determination process, a porosity of the crimped portion by AI analysis based on the outflow rate, and determines the quality of the crimped state of the crimped portion based on the porosity.

10. The method according to claim 7, wherein
in the determination process, a porosity of the crimped portion is obtained by AI analysis based on the image, and the quality of the crimped state of the crimped portion is determined based on the porosity.

11. The method according to claim 7, wherein
in the dropping process, the test solution containing a coloring agent is dropped.

12. The method according to claim 7, wherein
in the dropping process, the test solution containing an organic solvent is dropped.

13. A non-transitory storage medium in which a crimping determination program for determining a quality of a crimped state of a wire harness in which a crimping terminal is crimped to an electric wire, the program comprising: a dropping process of dropping a test solution to the wire harness, the wire harness including a crimped portion in which the electric wire is crimped by the crimping terminal, a first electric wire portion in which the electric wire is exposed on a distal end side with respect to the crimped portion, and a second electric wire portion in which the electric wire is exposed on a proximal end side with respect to the crimped portion, the test solution being dropped to either one of the first electric wire portion and the second electric wire portion in the dropping process;
a post-dropping image acquisition process of acquiring an image including the other one of the first electric wire portion and the second electric wire portion after the dropping process; and
a determination process of obtaining an outflow rate of the test solution in the other one of the first electric wire portion and the second electric wire portion based on the first image and the second image, and determines the quality of the crimped state of the crimped portion based on the outflow rate.

* * * * *